May 31, 1932.   T. G. SMITH   1,860,963
WEEDING AND TRANSPLANTING IMPLEMENT
Filed July 9, 1931
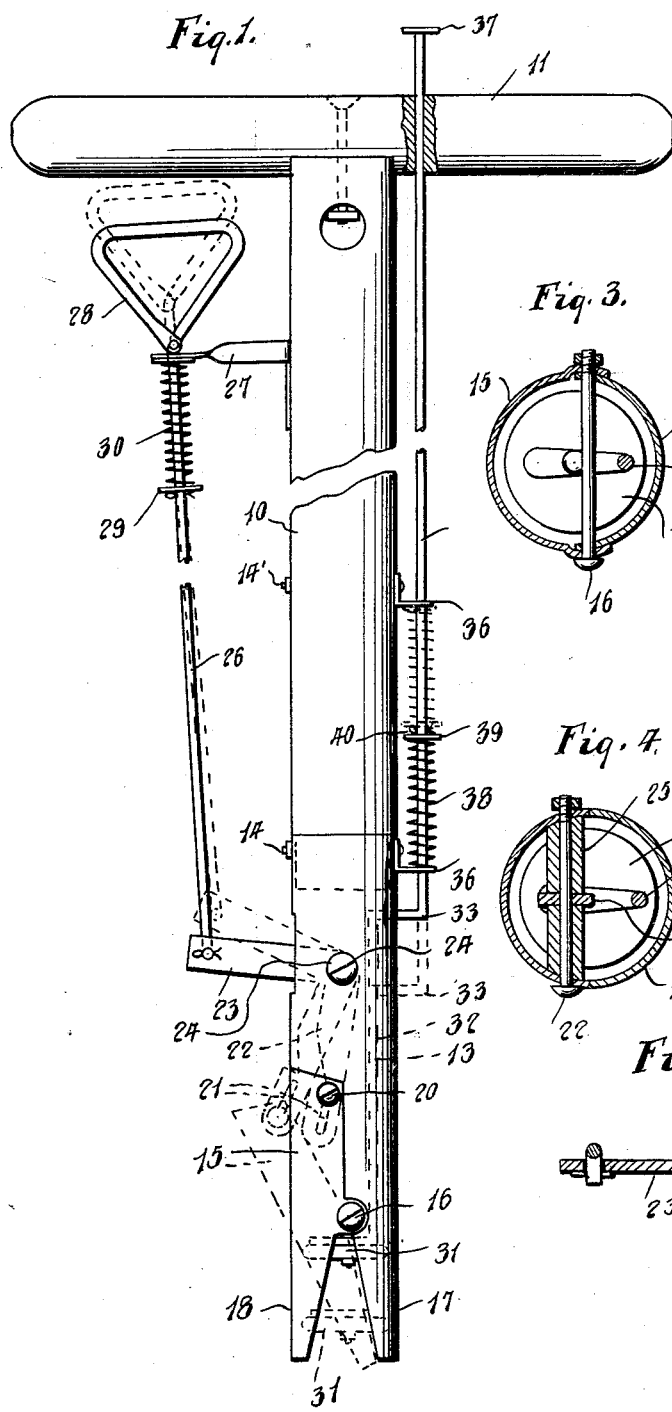
Inventor
T. G. Smith.

Patented May 31, 1932

1,860,963

UNITED STATES PATENT OFFICE

THOMAS GREEN SMITH, OF LAKE WORTH, FLORIDA

WEEDING AND TRANSPLANTING IMPLEMENT

Application filed July 9, 1931. Serial No. 549,751.

This invention relates to a weeding and transplanting implement.

It is aimed to provide a novel and inexpensive device by the operation of which weeds may be extracted from the lawn or plants transplanted, without the necessity of excessive bending or stooping on the part of the operator.

It is particularly aimed to provide a means wherein the device may cut roots of adjacent grass and loosen roots of the weeds prior to extraction, and also to provide a means for ejecting the extracted weeds from the device, such means being operable manually or automatically as preferred.

Various additional objects and advantages will become apparent from a consideration of the description following taken in connection with accompanying drawings illustrating an operative embodiment.

In said drawings:—

Figure 1 is a view of the implement in side elevation,

Figure 2 is a partial central vertical sectional view through the implement,

Figure 3 is a cross sectional view taken on the line 3—3 of Figure 2,

Figure 4 is a cross sectional view taken on the line 4—4 of Figure 2,

Figure 5 is a cross sectional view taken on the line 5—5 of Figure 2, and

Figure 6 is a transverse sectional view taken on the line 6—6 of Figure 2.

Referring specifically to the drawings, the device embodies a staff at 10 of any desired length, which is equipped with a handle or cross bar 11 at the top thereof. Bolted or otherwise fastened at 14 to the lower end of the staff 10 is a metallic tube or sleeve 13. The lower end of the tube 13 is cut away and accommodates a movable jaw section 15, arcuate in cross section, and detachably bolted as at 16 to the tube 13. The tube 13 and section 15 have coacting jaws 17 and 18 at their lower ends, whose longitudinal edges 19 are sharpened as best shown in Figure 5.

Fastened to the upper end of the section 15 is a bolt 20 which passes through an elongated slot 21 in an arm 22 of a bell crank lever 23 bolted or otherwise pivoted at 24 to the tube 13. Spacing sleeves 25 are provided in the tube 13 along the bolt 20 on opposite sides of the arm 22. An operating rod 26 is pivoted to the bell crank lever 23, passes slidably through a guide bracket 27 fastened to the staff 10 and above the same has a suitable handle 28. An abutment 29 is provided on rod 26 and an expansive spring 30 surrounds the rod and abuts the bracket 27 and abutment 29, thus urging the jaw 18 toward the jaw 17, under normal conditions, and to the full line position shown in Figures 1 and 2.

In the operation of the device, the same being grasped by the handle 11 is thrust into the ground about a weed and then turned so that the edges 19 will cut the roots of adjacent grass, after which, the handle 20 is engaged and drawn toward the handle 11, thereby tilting the section 15 into the dotted line position of Figure 1, moving the jaw 19 against the jaw 17 and gripping the weed. In this condition, the device may be elevated from the lawn or soil and the weed removed or discarded. The action is the same in the case of transplanting or in providing holes or drills for plants.

Means are provided to eject the weed or material from the jaws 17 and 18. In this connection a follower plate 31 is located within the tube 13, carried by a rod 32 having an offset portion 33 extending through an enlarged opening 34 in the tube 13, and thence terminating in a vertical or operating portion 35, passing slidably through guide brackets 36 and slidably through the handle 11, terminating in a knob at 37. The ejector may be urged to retracted position, that is the full line position shown in Figure 1 by an expansive coil spring 38 which abuts one of the brackets 36 and an abutment 39 on the rod 35, the abutment 39 being removable, particularly being held in place by a cotter 40 passed through an opening in the rod. The brackets 36 are also removable, one of them being fastened by the bolt 14 and the other fastened by a bolt 14'. The knob 37 is preferably screw threaded to the rod 35 or otherwise removable.

In some instances, it is preferred that the ejector 31 work automatically. In such instances, a spring 38 and stop or washer 39 are transferred from the full line to the dotted line position shown in Figure 1. The spring thus engages the upper abutment or bracket 36 and the stop 39, maintaining and urging the follower 31 and associated parts in the dotted line position shown in that figure. Upon thrusting the device into the ground, the ground will prevent movement of the follower 31 while the blades 17 and 18 move into the same and the blade 18 moves toward the blade or jaw 17. The device is removed from the ground with the jaw 18 in contact with the jaw 17 and upon the handle 28 being released the device is free of the ground, spring 30 restores the section 15 to normal position and the spring 38 having been placed under tension causes automatic movement of the ejector 31 and accordingly ejection of the weed or the like.

Various changes may be resorted to provided they fall within the spirit and scope of the invention.

I claim as my invention:—

1. A device of the class described comprising a staff provided with a sleeve, a section pivoted to the sleeve, said section and sleeve having jaws provided with cutting edges, a bell crank lever pivoted to the sleeve, a pin and slot connection between one arm of said lever and the section, an operating means connected to the other arm of said lever, an ejector movable in said tube, and means urging and maintaining the ejector adjacent the lower end of the jaws, whereby the engaged earth will enable the jaws to move relatively to the ejector, and the latter will operate automatically upon release of the jaws.

2. A device of the class described having jaws to penetrate the soil, a follower between the jaws, a rod extending from the follower, guide means for the rod, abutments means on the rod, and an expansive spring on the rod between said abutment means and one of the guide means, said spring being transferable from a position engaging one guide means to a position engaging the other guide means, to thereby enable the follower to operate automatically or to normally remain retracted.

3. A device of the class described having jaws to penetrate the soil, one of said jaws being mounted for movement relatively to the other jaw, means to actuate said movable jaw, a follower movable between said jaws to eject the soil from between the jaws, and a spring for actuating the follower, said spring being transferable in position whereby it will operate to automatically move the follower into ejecting position or to normally retract the follower from ejecting position.

In testimony whereof I affix my signature.

THOMAS GREEN SMITH.